United States Patent
De Barros et al.

(10) Patent No.: US 9,954,894 B2
(45) Date of Patent: Apr. 24, 2018

(54) WEBPAGE SECURITY

(71) Applicant: Microsoft Technology Licensing, LLC, Redmond, WA (US)

(72) Inventors: Marcelo Medeiros De Barros, Bellevue, WA (US); Sarvesh Nagpal, Redmond, WA (US); Abinash Sarangi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 46 days.

(21) Appl. No.: 15/060,817

(22) Filed: Mar. 4, 2016

(65) Prior Publication Data
US 2017/0257393 A1 Sep. 7, 2017

(51) Int. Cl.
*H04L 29/06* (2006.01)
*G06F 21/54* (2013.01)
*G06F 21/12* (2013.01)

(52) U.S. Cl.
CPC ........ *H04L 63/1466* (2013.01); *G06F 21/128* (2013.01); *G06F 21/54* (2013.01); *H04L 63/1416* (2013.01); *H04L 63/168* (2013.01)

(58) Field of Classification Search
CPC .......... G06F 17/3089–17/30896; G06F 21/10; G06F 21/12; G06F 21/50–21/577; H04L 63/1416; H04L 63/1441–63/145; H04L 63/1466; H04L 63/1483; H04L 63/168; H04L 67/02–67/025; H04L 67/2804
See application file for complete search history.

(56) References Cited

U.S. PATENT DOCUMENTS

| | | | |
|---|---|---|---|
| 8,220,037 B2 | 7/2012 | Snyder et al. | |
| 8,458,765 B2 | 6/2013 | Aciicmez et al. | |
| 8,635,701 B2 | 1/2014 | Hilaiel et al. | |
| 8,677,141 B2 | 3/2014 | Erlingsson et al. | |
| 8,732,794 B2 | 5/2014 | Boodaei et al. | |
| 9,032,066 B1 * | 5/2015 | Erdmann | G06F 21/53 709/224 |
| 9,043,863 B1 | 5/2015 | Enderwick et al. | |

(Continued)

OTHER PUBLICATIONS

Grier, et al., "Secure Web Browsing with the OP Web Browser", In Proceedings of IEEE Symposium on Security and Privacy, May 18, 2008, pp. 402-416.

(Continued)

*Primary Examiner* — Ashokkumar B Patel
*Assistant Examiner* — Kevin Bechtel
(74) *Attorney, Agent, or Firm* — Shook, Hardy & Bacon, L.L.P.

(57) ABSTRACT

Aspects of the technology described herein allow webpages to maintain control over content displayed as part of the webpage when viewed on a browser. The technology described herein can send a security script and validation rules along with a webpage to a web browser. The web browser then runs the security script, which monitors content on the webpage. In one aspect, when an add-in attempts to display secondary content, the security script checks identification information associated with the secondary content against the validation rules, which lists authorized content. If the secondary content does not satisfy a validation rule, then the security script can prevent the browser from displaying the secondary content.

19 Claims, 7 Drawing Sheets

(56) References Cited

U.S. PATENT DOCUMENTS

| | | |
|---|---|---|
| 9,112,853 B2 | 8/2015 | Qureshi |
| 9,154,364 B1 | 10/2015 | Daswani et al. |
| 9,160,756 B2 | 10/2015 | Pieczul et al. |
| 2010/0037317 A1 | 2/2010 | Oh |
| 2014/0337495 A1 | 11/2014 | Branton et al. |
| 2015/0082440 A1* | 3/2015 | Pickett .................. H04L 63/145 726/24 |
| 2016/0036849 A1* | 2/2016 | Zakian ................ H04L 63/1441 726/23 |
| 2016/0142428 A1* | 5/2016 | Pastore ............... H04L 63/1466 726/23 |

OTHER PUBLICATIONS

Provos, et al., "The Ghost in the Browser Analysis of Web-based Malware", In Proceedings of First Conference on First Workshop on Hot Topics in Understanding Botnets, Apr. 10, 2007, 9 pages.

Dewald, "ADSandbox: Sandboxing JavaScript to fight Malicious Websites", In Proceedings of ACM Symposium on Applied Computing, Mar. 22, 2010, pp. 1859-1864.

\* cited by examiner

WEBPAGE SECURITY

BACKGROUND

Browser extensions allow developers to add functionality to the browser and enhance the user interface in a way that is not directly related to the viewable content of webpages. This class of extensibility includes add-on functionality that users might install to enhance their browsing experience. A toolbar is one example of a browser extension. A browser toolbar is a toolbar that resides within a browser's window and is a way to extend the browser's user interface and functionality. Browser extensions can have access to everything done by the browser, and can do things like inject ads or other content into webpages, or make "background" Hypertext Transfer Protocol (HTTP) requests to a third-party server. This power can be abused by browser extensions; while webpages are constrained by the security model of the web, extensions are not. As a result, a browser extension may not behave as described, and take action against the interest of the user who installed it. Such browser extensions are a form of malware.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein allow webpages to maintain control over content displayed as part of the webpage when viewed on a browser. Currently, browser functionality allows plug-ins (also described herein as add-ins) to modify the appearance of a webpage as it is displayed in the browser. The modifications can include adding secondary content to a webpage. The secondary content can often replace original webpage content. For example, a plug-in could replace a photograph on a webpage with a different photograph. Or plug-in could replace a reference web link with another reference web link.

The technology described herein can prevent an add-in from replacing content on a webpage with secondary content that does not originate at the webpage. The technology described herein can send a security script and validation rules along with a webpage to a web browser. The web browser then runs the security script, which monitors content on the webpage. In one aspect, when an add-in attempts to display secondary content, the security script checks identification information associated with the secondary content against the validation rules, which lists authorized content. If the secondary content does not satisfy a validation rule, then the security script can prevent the browser from displaying the secondary content.

In another aspect, one or more content items on a webpage are monitored by an observation program provided as part of the security script. The observation program can look at the document object model and ascertain when changes to user interface elements occur. In some instances, plug-ins can have administrative rights that allow the plug-in to override aspects of the security script's ability to block the presentation of content. In this instance, the document object model can be monitored and restored to its original state upon detecting an unauthorized change to a user interface element. The unauthorized change can be described as a mutation herein. The unauthorized change can be detected by comparing objects displayed within the document object model to an authorized list of objects communicated by a web server with the webpage.

BRIEF DESCRIPTION OF THE DRAWINGS

Aspects of the technology described in the present application are described in detail below with reference to the attached drawing figures, wherein.

DETAILED DESCRIPTION

Figure 1:
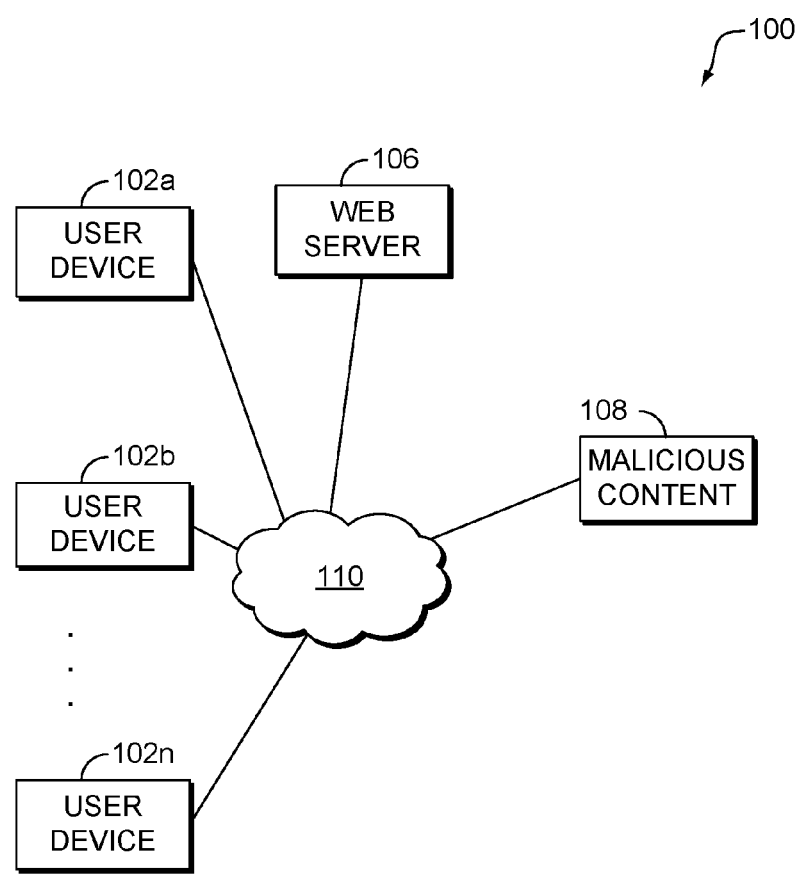
FIG. 1 is a block diagram of an exemplary computing environment suitable for implementing aspects of the technology described herein.

The technology of the present application is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein allow webpages to maintain control over content displayed as part of the webpage when viewed on a browser. Currently, browser functionality allows plug-ins (also described herein as add-ins) to modify the appearance of a webpage as it is displayed in the browser. The modifications can include adding secondary content to a webpage. The secondary content can often replace original webpage content. For example, a plug-in could replace a photograph on a webpage with a different photograph.

Some of the secondary content added by a plug-in can be nefarious. Upon clicking on a secondary content item or link provided by an add-in, the user can be taken to a webpage that spoofs a known webpage and tricks the user into providing confidential information, such as passwords and usernames. In other instances, a linked site can include unwanted or low quality content that a user does not wish to view. The user may mistakenly believe that the content is provided by the operator of the webpage.

The add-in can often be authorized by a user that willingly installs the add-in thinking that the add-in would only provide a certain service, such as a new background. The add-in can provide a legitimate service, such as an updated background, but also alter other aspects of a webpage in an attempt to generate revenue, for example, by directing user traffic to affiliated webpages.

The technology described herein can prevent an add-in from replacing content on a webpage with secondary content that does not originate at the webpage. The technology described herein can send a security script and validation rules along with a webpage to a web browser. The web browser then runs the security script, which monitors content on the webpage. In one aspect, when an add-in attempts to display secondary content, the security script checks identification information associated with the secondary content against the validation rules, which lists authorized content. If the secondary content does not satisfy a validation rule, then the security script can prevent the browser from displaying the secondary content.

In another aspect, one or more content items on a webpage are monitored by an observation program provided as part of the security script. The observation program can look at the document object model and ascertain when changes to user interface elements occur. In some instances, plug-ins can have administrative rights that allow the plug-in to override aspects of the security script's ability to block the presentation of content. In this instance, the document object model can be monitored and restored to its original state upon detecting an unauthorized change to a user interface element. The unauthorized change can be described as a mutation herein. The unauthorized change can be detected by comparing objects displayed within the document object model to an authorized list of objects communicated by a web server with the webpage.

Having briefly described an overview of aspects of the technology described herein, an exemplary operating environment suitable for use in implementing the technology is described below.

Exemplary Operating Environment

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; web server 106; malicious content source 108; and network 110. It should be understood that environment 100 shown in FIG. 1 is an example of one suitable operating environment. Each of the components shown in FIG. 1 may be implemented via any type of computing device, such as computing device 700 described in connection to FIG. 7, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102a and 102b through 102n can be user devices on the client-side of operating environment 100, while web server 106 can be on the server-side of operating environment 100. The user devices can access webpages using a browser. In one aspect, the browser application on the user devices accesses a search engine webpage hosted by the web server 106.

Web server 106 can comprise server-side software designed to work in conjunction with client-side software on user devices 102a and 102b through 102n so as to implement any combination of the features and functionalities discussed in the present disclosure. For example, the web server 106 may receive a request for a webpage, generate a website, and communicate the webpage to the user device. The web server 106 can also generate and communicate validation rules to the browser on the user devices. This division of operating environment 100 is provided to illustrate one example of a suitable environment, and there is no requirement for each implementation that any combination of web server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 7 herein. By way of example and not limitation, a user device may be embodied as a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device. The user devices can run one or more browser applications.

The malicious content source 108 can be affiliated with one or more browser plug-ins. The browser plug-ins can attempt to insert secondary content provided by the malicious content source 108 into a webpage. The malicious content can be specially tailored to seamlessly fit into a particular webpage in an effort to trick users into thinking the content is from the webpage.

Figure 2:
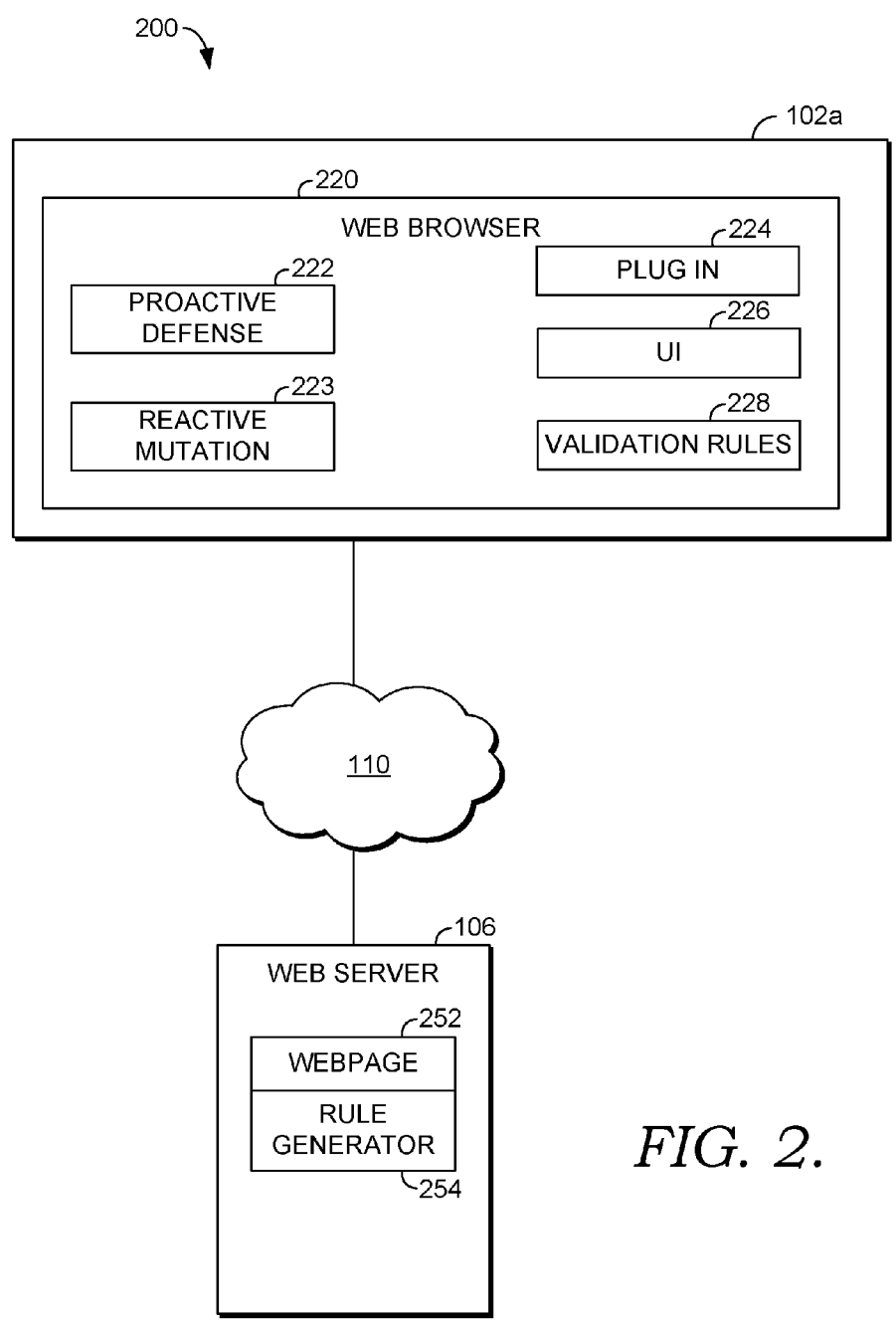
FIG. 2 is a diagram depicting an exemplary computing environment for securing a webpage from interference from a browser plug-in, in accordance with an aspect of the technology described herein.

Referring now to FIG. 2, with FIG. 1, a block diagram is provided showing aspects of an example computing system architecture suitable for implementing an aspect of the technology described herein and designated generally as computing environment 200. Computing environment 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

The computing environment 200 includes a user device 102a communicatively coupled to the web server 106 through network 110. The user device 102a can be any type of computing device, such as a smartphone, laptop, personal computer, e-reader, virtual reality glasses, augmented reality glasses, and such.

Among applications not shown, the user device 102a includes a web browser 220. The web browser 220 could be any of a variety of available web browsers. The web browser 220 (commonly referred to as a browser) is a software application for retrieving, presenting, and traversing information resources on the Internet. An information resource is identified by a Uniform Resource Identifier/Location (URI/URL) and may be a webpage, image, video, or other piece of content. In general, the web browser 220 will request content, for example, with an HTTP request directed to a URL. Once received, the user interface component 226 may display the requested content. In addition to a user interface component 226, the web browser 220 can include a layout engine, rendering engine, JavaScript interpreter, UI backend, networking component, and data persistence component. These components (not shown) work together to provide web browser capabilities.

The web browser 220 includes a plug-in 224. A plug-in 224 (also described as an add-in or browser extension) is a computer program that extends the functionality of a web browser in some way. Browser extensions can change the user interface of the web browser. Browser extensions have access to many of the browser functions mentioned above, and can do things like inject ads or other content into webpages, or make "background" HTTP requests to a third-party server, such as malicious content source 108. The ability to access browser functionality can be abused. For example, a browser extension may attempt to replace content provided by a webpage with its own content. Exemplary content can include visible content such as an image or functional content, such as a reference web link with another reference web link. A goal of the present technology is to prevent this abuse.

In one aspect, the web browser includes a proactive defense component 222, a reactive mutation component 223, and validation rules 228. In one aspect, the proactive defense component 222, the reactive mutation component 223, and the validation rules 228 are provided to the web browser 220 by the web server 106. In one aspect, the components are provided in response to the request for a webpage as shown in more detail with reference to FIG. 3.

Figure 3:
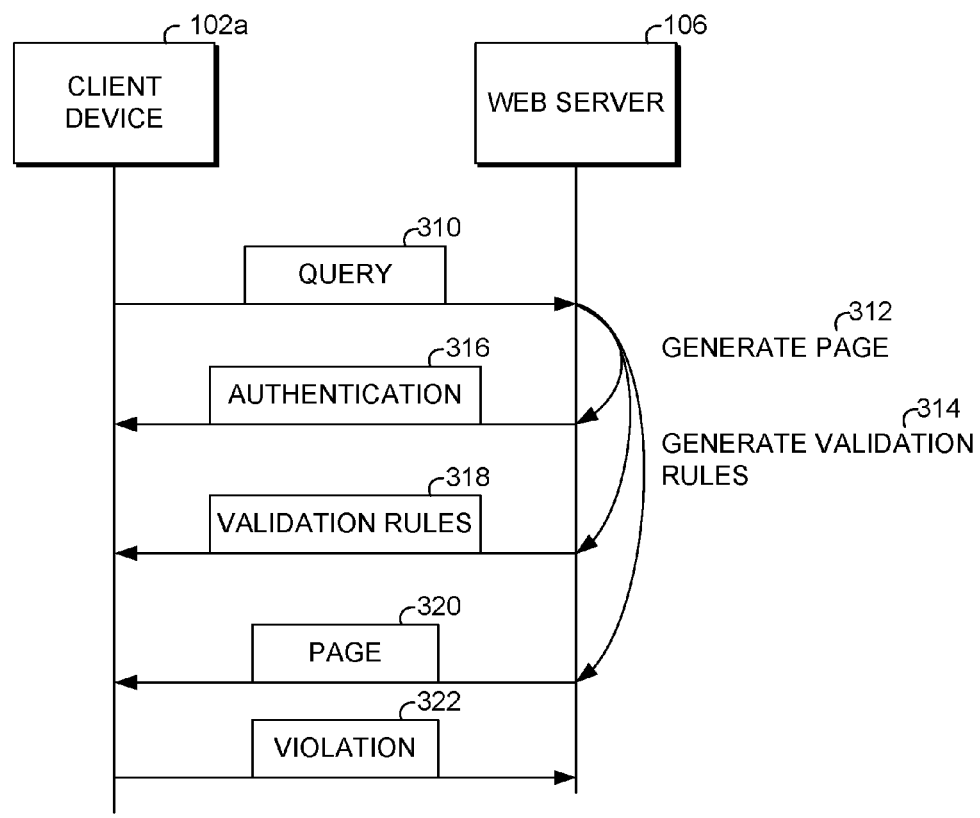
FIG. 3 is a diagram depicting communications between a web browser and a webpage server, in accordance with an aspect of the technology described herein.

Turning briefly to FIG. 3, communications occurring between the user device 102a and the web server 106 are shown. FIG. 3 includes a user device 102a and a web server 106. Initially, a web browser running on user device 102a sends a query 310 to the web server 106. In this example, the web server is a search engine. The query may have been entered through a search box on an initial webpage, such as a search engine landing page, provided by the web server 106. In another aspect, the query is provided by a personal assistant application or some other program on the user device 102a. A query 310 is one type of request for a webpage.

The web server 106 generates a dynamic webpage at step 312. In this example, the dynamic webpage is a search results webpage. The search results webpage is generated by identifying content that is responsive to the query, ranking that content in order of relevance to the user, and inserting the content into a display template designed for search results. The template can be selected based on the form factor of the user device 102a, the type of browser (e.g., brand, version), the user device 102a operation system, and other factors. The search results page can also include advertisements, logos, page search results, maps, images, and other user element features, described herein as content. A dynamic webpage can be one that is written using a server-side scripting language such as PHP, ASP, JSP, or Coldfusion. In such a page, the content is called in by the scripting language from other files or from a database depending on actions taken by the user.

Prior to communicating the webpage to the user, the web server 106 generates validation rules at step 314. The validation rules can include a white list of content items or user interface features that are included in the webpage. The list can identify individual user interface elements according to an ID scheme. The validation rules can be generated by scanning each content item on the webpage and retrieving a unique identification for the content item. The unique identification can include a name of the object and URL for the object or other identifying information. The content items can include visible user interface elements, such as images and text. The content items can also include function elements, such as links. In one aspect, a malicious plug-in can attempt to change a reference web link with another reference web link. The validation rules can identify the original links on a web page.

In one aspect, prior to sending the generated webpage to the user device, an authentication script 316 is communicated from the web server 106 to the user device 102a. The authentication script 316 can include the proactive defense component 222 and the reactive mutation component 223. Together the components can override browser-defined functions with custom logic to validate, using the validation rules, any changes made to content in the webpage. The authentication program can override browser-defined functions to require validation before allowing any script to add or remove user interface elements from the page including script elements.

The reactive mutation component 223 can provide a second layer of defense in the form of an observer, which constantly observes elements of interest on the webpage. The observer can take the form of a Java function that causes a notification to be generated when an observable object, such as the UI element, is changed. The observer is programmed to detect any modifications to an observable element or their descendants or attributes. A link is one example of attribute of an observable element. Plug-ins may attempt to change a link associated with an object without changing an appearance of an object. When such a modification is detected, the validation rule set is fired, and if the validation fails for the changed element, then the change is undone, and the element is restored to the previous state. The authentication program can prevent content from being downloaded by the browser as well as override XmlHTTP request objects (as one example) before sending the request out. The XMLHttpRequest object is used to exchange data with a server behind the scenes without reloading the webpage.

The authentication program, including the proactive defense component 222 and the reactive mutation component 223, can be JavaScript programs that are imbedded or referenced in the webpage 320. In one aspect, an instruction is provided for the browser 220 to run the proactive defense component 222 and the reactive mutation component 223 before loading the page into the browser 220.

The browser 220 on user device 102a can communicate a violation notification 322 to the web server 106 upon detecting an unauthorized user interface change. As mentioned, the user interface change is unauthorized when it does not satisfy a validation rule. The web server 106 can use the violation notification 322 to better understand which user interface elements on the webpage are being targeted by plug-ins for mutations. This information can be used in the future to generate validation rules. User interface features that are not being targeted by add-ins could be excluded from the validation rules. The user interface features that are included in the validation rules can be learned through a training process that relies on the violation notifications. In some instances, the validation rule set includes all user interface features on a given page for the purpose of gathering data. This type of rule set could be considered an exploration rule set. In other instances, a more carefully tailored validation rule set could focus on user interface features that have been targeted.

Returning to FIG. 2, the web server 106 can include a webpage generation component 252 and a rule generator 254. The webpage component 252 generates a webpage, including a dynamic webpage, in response to a request. In one aspect, the request is a query. A dynamic webpage can be generated by retrieving relevant information from a knowledge base or data store and inserting it into a display template.

The rule generator 254 generates a unique set of validation rules for each webpage generated. Because the webpage can be a dynamically generated webpage, each dynamically generated webpage can include unique information and require a unique validation rule set. As mentioned, the validation rule set includes information that identifies various user interface elements for monitoring. The user interface elements can include images and text (e.g., a search result) on a webpage. The user interface elements can also include function elements, such as links. In one aspect, a malicious plug-in can attempt to change a reference web link with another reference web link. The validation rules can identify the original links on a web page.

Figure 4:
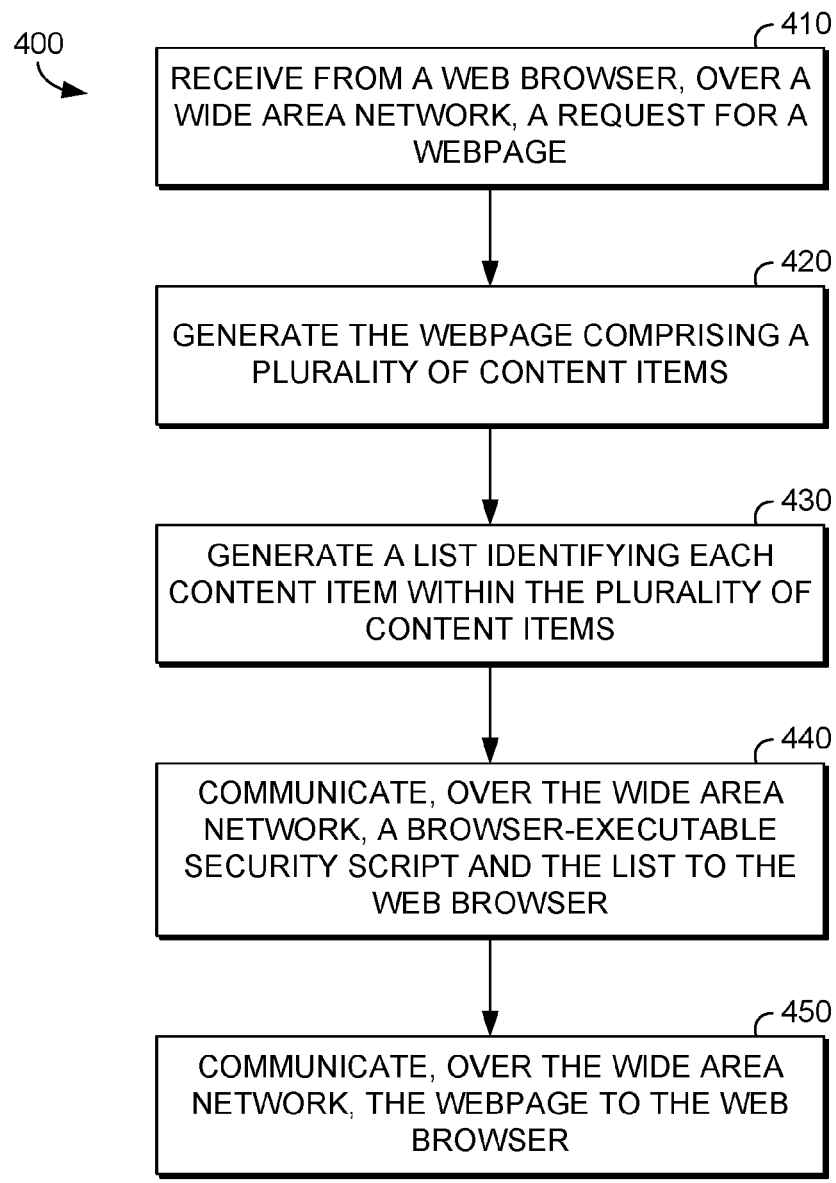
FIG. 4 is a diagram depicting a method to prevent a web browser add-in from adding secondary content to a user interface displaying a webpage, in accordance with an aspect of the technology described herein.

Turning now to FIG. 4, a method 400 to prevent a web browser add-in from adding secondary content to a user interface displaying a webpage through a web browser is provided. Method 400 may be performed by a web server.

At step 410, a request for a webpage is received from a web browser over a network, such as the Internet. The request can be an HTTP Get request, a query, or some other type of request.

At step 420, the webpage comprising a plurality of content items is generated. The content items can alternatively be described herein as a user interface element. In one aspect, the webpage is a dynamic webpage. A dynamic webpage can be one that is written using a server-side scripting language such as PHP, ASP, JSP, or Coldfusion. In such a page, the content is called in by the scripting language from other files or from a database depending on actions taken by a user, such as providing a specific query.

The webpage can be a dynamically generated webpage, such as a search results webpage. The search results webpage is generated by identifying content that is responsive to the query, ranking that content in order of relevance to the user, and inserting the content into a display template designed for search results. The template can be selected based on the form factor of the user device 102a, the type of browser (e.g., brand, version), the user device 102a operation system, and other factors. The search results page can also include advertisements, logos, page search results, maps, images, and other user element features, described herein as content. The end result is a dynamically generated webpage that includes a unique collection of content items.

Generating the webpage can include retrieving, at the web server, third-party content, such as advertisements. The third-party content can be retrieved for the purpose of generating identification information for the content.

At step 430, a list identifying each content item within the plurality of content items is generated. The list may be described as a validation rule set or white list. The list may include all of the content items on the webpage or a subset. For example, the subset may include items most likely to be targeted for replacement or modification by a browser extension. The validation rules can be generated by scanning each content item on the webpage and retrieving a unique identification for the content item. The unique identification can include a name of the object, a URL for the object, or other identifying information. Third-party content, such as advertisements, may be identified according to the URL. The content items can include images and text (e.g., a search result) on a webpage. The user content items can also include function elements, such as links. In one aspect, a malicious plug-in can attempt to change a reference web link with another reference web link. The validation rules can identify the original links on a web page.

The web server can use violation notifications to better understand which user interface elements on the webpage are being targeted by plug-ins for mutations. This information can be used to determine which content items should be included in a validation rules set or list. User interface features that are not being targeted by add-ins could be excluded from the validation rules. The user interface features that are included in the validation rules can be learned through a training process that relies on the violation notifications. In some instances, the validation rule set includes all user interface features on a given page for the purpose of gathering data. This type of rule set could be considered an exploration rule set. In other instances, a more carefully tailored validation rule set could focus on user interface features that have been targeted.

At step 440, a browser-executable security script and the list is communicated over the network to the web browser. The script could be embedded in the webpage. In one aspect, an instruction to run the script prior to loading the webpage is provided.

At step 450, the webpage is communicated over the network to the web browser. The webpage can be communicated in the form of an HTTP response message. The HTTP response messages can include links to third-party content that can cause the browser to make additional requests to retrieve all of the relevant content items.

Figure 5:
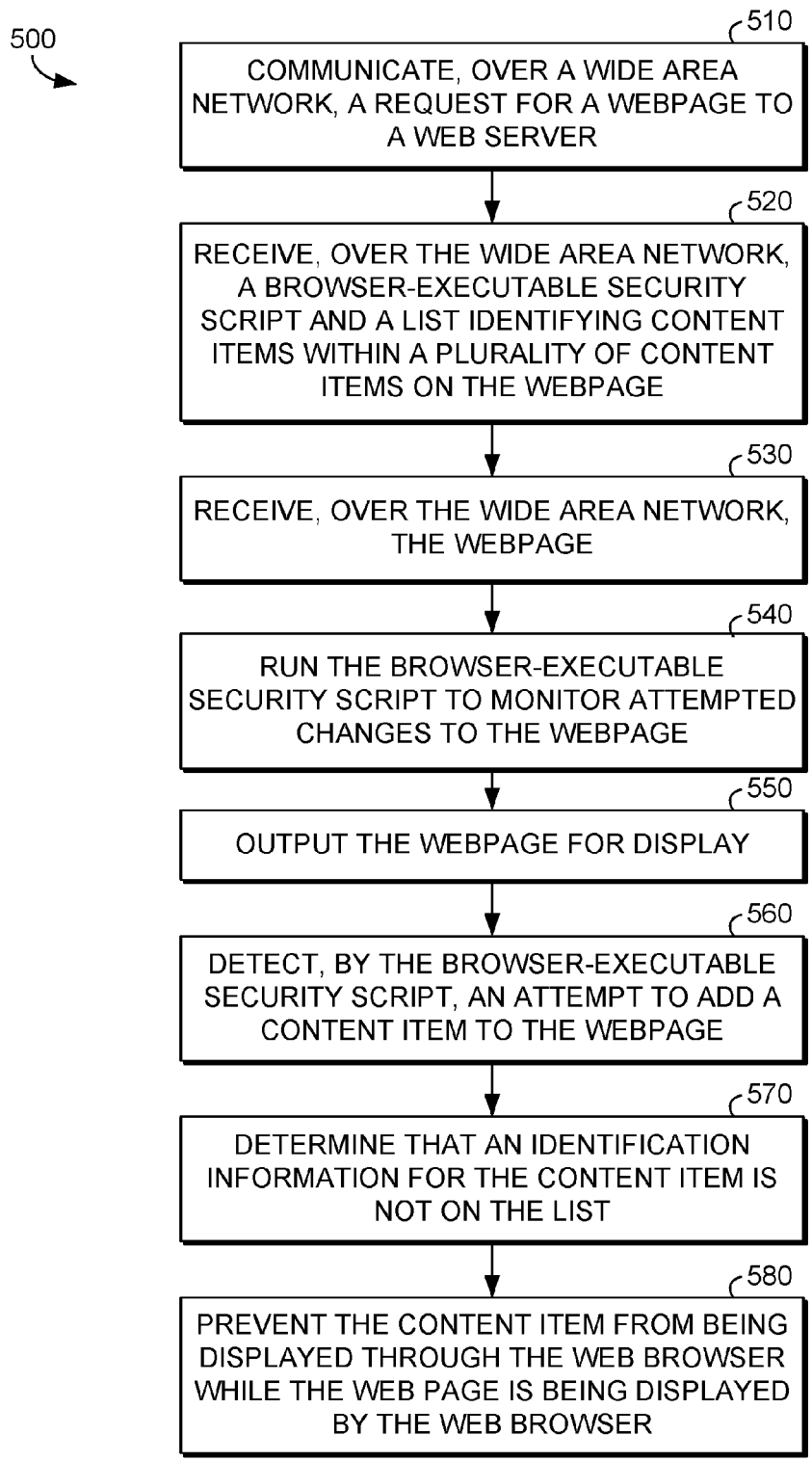
FIG. 5 is a diagram depicting a method to prevent a web browser add-in from adding secondary content to a user interface displaying a webpage, in accordance with an aspect of the technology described herein.

Turning now to FIG. 5, a method 500 to prevent a web browser add-in from adding secondary content to a user interface displaying a webpage through a web browser is provided. Method 500 may be performed by a web browser running on a user device.

At step 510, a request for the webpage is communicated over a network to a web server. The webpage comprises a plurality of content items. The request can be an HTTP Get request, a query, or some other type of request.

At step 520, a browser-executable security script and a list identifying content items within the plurality of content items on the webpage are received over the network. The script could be embedded in the webpage. In one aspect, an instruction to run the script prior to loading the webpage is provided. This list can include all content items on a webpage or just a subset. The list can include object identification information, valid URLs, etc. The content items can include images and text (e.g., a search result) on a webpage. The user content items can also include function elements, such as links. In one aspect, a malicious plug-in can attempt to change a reference web link with another reference web link. The validation rules can identify the original links on a web page.

At step 530, the webpage is received over the network. The webpage can be communicated in the form of an HTTP response message. The HTTP response messages can include links to third-party content that can cause the browser to make additional requests to retrieve all of the relevant content items.

At step 540, the browser-executable security script is run to monitor attempted changes to the webpage. In one aspect, the browser-executable security script is executed by the web browser components, such as a JavaScript interpreter.

At step 550, the webpage is output for display. In one aspect, the browser-executable security script is executed by the web browser components, such as a user interface component 226, described previously.

At step 560, an attempt to add a content item to the webpage is detected by the browser-executable security script. As mentioned, the script can monitor all changes made by scripts running in the browser.

At step 570, the browser-executable security script determines that the content item is not included in the list. The script can make this determination by comparing identification information for the content item with identification information in the list for valid content items.

At step 580, the content item is prevented from being displayed through the web browser while the webpage is being displayed by the web browser. The script can override browser-defined functions with custom logic to validate, using the validation rules, any changes made to content in the webpage. The authentication program can override browser-defined functions to require validation before allowing any script to add or remove user interface elements from the page including script elements.

Figure 6:
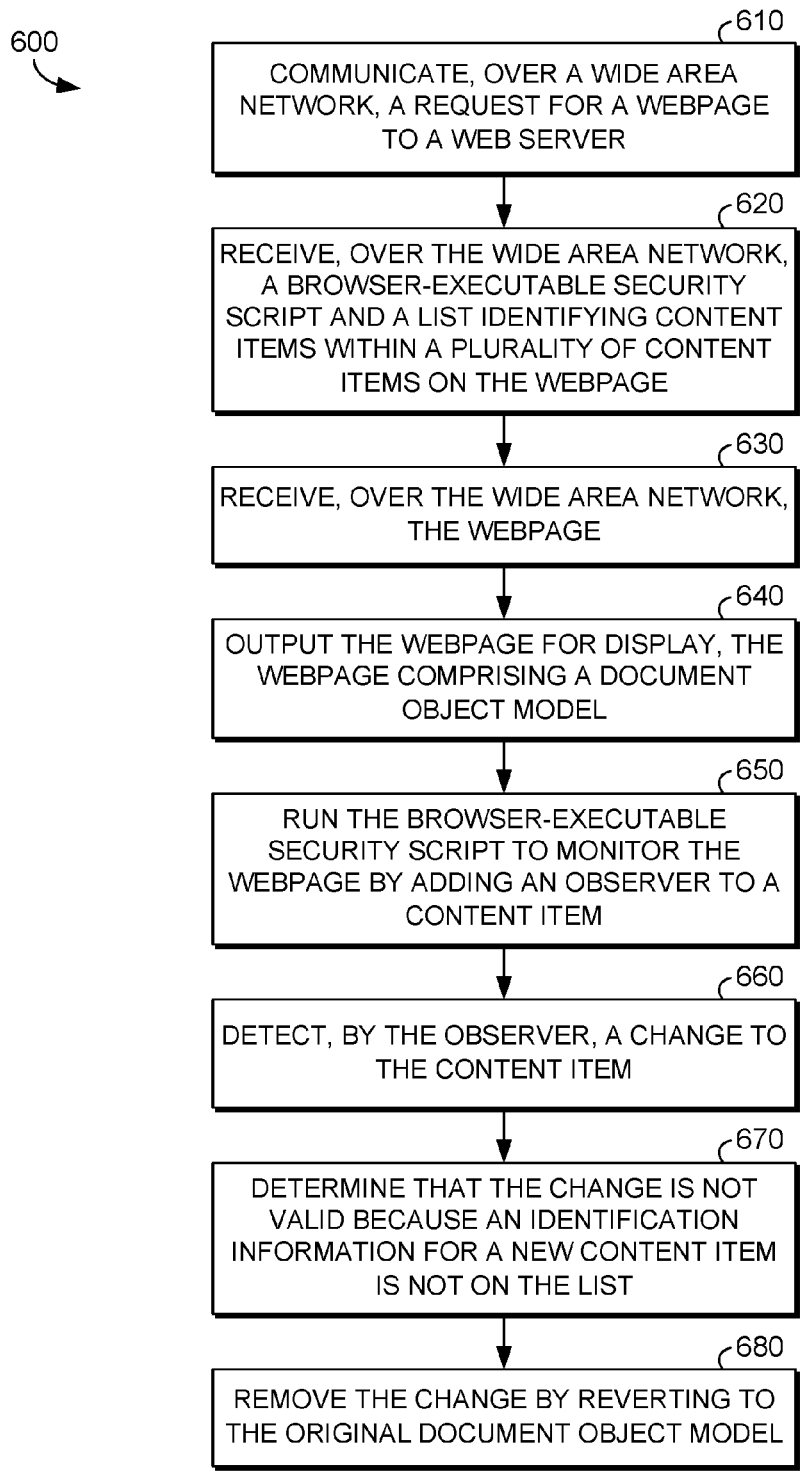
FIG. 6 is a diagram depicting a method to prevent a web browser add-in from adding secondary content to a user interface displaying a webpage, in accordance with an aspect of the technology described herein.

Turning now to FIG. 6, a method 600 to prevent a web browser add-in from adding secondary content to a user interface displaying a webpage through a web browser is provided. Method 600 may be performed by a web browser running on a user device.

At step 610, a request for the webpage is communicated over a network to a web server. The request can be an HTTP request. In another aspect, the request is a search query.

At step 620, a browser-executable security script and a list identifying content items within a plurality of content items on the webpage is received over the network. The script could be embedded in the webpage. In one aspect, an instruction to run the script prior to loading the webpage is provided. This list can include all content items on a webpage or just a subset. The list can include object identification information, valid URLs, etc.

At step 630, the webpage is received over the network. The webpage can be communicated in the form of an HTTP response message. The HTTP response messages can include links to third-party content that can cause the browser to make additional requests to retrieve all of the relevant content items.

At step 640, the webpage is output for display. The webpage comprises a document object model. The document object model (DOM) is a cross-platform and language-independent convention for representing and interacting with objects (such as content items) in HyperText Markup Language (HTML), Extensible HyperText Markup Language (XHTML), and Extensible Markup Language (XML) documents, such as webpages. The document elements are organized in a tree structure, called the DOM tree. Objects in the DOM tree may be addressed and manipulated by using methods on the objects. Browser extensions may attempt to manipulate content items using these methods. The technology described herein attempts to prevent changes by these extensions.

At step 650, the browser-executable security script is run to monitor the webpage by adding an observer to a content item. In one aspect, the browser-executable security script is executed by the web browser components, such as a JavaScript interpreter. The observer can constantly observe elements of interest on the webpage. The observer can take the form of a Java function that causes a notification to be generated when an observable object, such as the content item, is changed. The authentication program can prevent content from being downloaded by the browser as well as override XMLHttpRequest object (as one example) before sending the request out. The XMLHttpRequest object is used to exchange data with a server behind the scenes without reloading the webpage.

The content items can include images and text (e.g., a search result) on a webpage. The user content items can also include function elements, such as links. In one aspect, a malicious plug-in can attempt to change a reference web link with another reference web link. The validation rules can identify the original links on a web page.

At step 660, the observer detects a change to the content item. The observer is programed to detect any modifications to an observable element or their descendants or attributes and provide a notification when a change is observed.

At step 670, the browser-executable security script determines that the change is not valid because identification information for a new content item is not on the list. When such a modification is detected, the validation rule set is fired, and if the validation fails for the changed element, then the change is undone, and the element is restored to the previous state.

At step 680, the change is removed by reverting to an original document object model. When the DOM is changed, the corresponding content on the webpage is restored to its original state.

Figure 7:
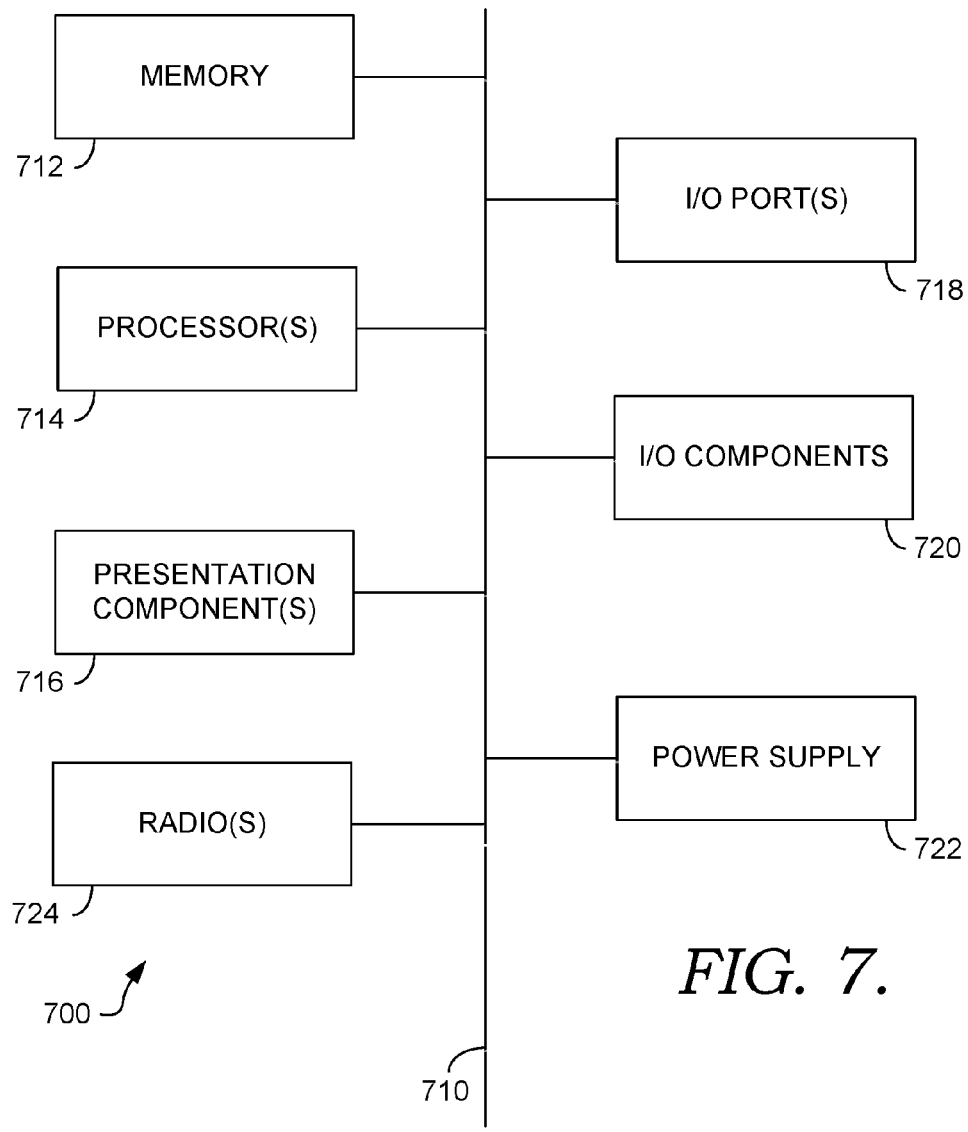
FIG. 7 is a block diagram of an exemplary computing environment suitable for implementing aspects of the technology described herein.

Referring to the FIG. 7 in particular, an exemplary operating environment for implementing aspects of the technology described herein is shown and designated generally as computing device 700. Computing device 700 is but one example of a suitable computing environment and is not intended to suggest any limitation as to the scope of use of the technology described herein. Neither should the computing device 700 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, and an illustrative power supply 722. Bus 710 represents what may be one or more busses (such as an address bus, data bus, or a combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 7 and refer to "computer" or "computing device." The computing device 700 may be a PC, a tablet, a smartphone, virtual reality headwear, augmented reality headwear, a game console, and such.

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Exemplary memory includes solid-state memory, hard drives, optical-disc drives, etc. Computing device 700 includes one or more processors 714 that read data from various entities such as bus 710, memory 712, or I/O components 720. Presentation component(s) 716 present data indications to a user or other device. Exemplary presentation components 716 include a display device, speaker, printing component, vibrating component, etc. I/O ports 718 allow computing device 700 to be logically coupled to other devices, including I/O components 720, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separate from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 700. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

The computing device 700 may include a radio 724. The radio transmits and receives radio communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth® connection to another computing device is a second example of a short-range connection. A long-range connection may include a connection using one or more of CDMA, GPRS, GSM, TDMA, and 802.16 protocols.

Embodiments Section

Embodiment 1. A web server comprising: at least one processor; and memory having computer-executable instructions stored thereon that, when executed by the at least one processor, configure the web server to: receive from a web browser, over a network, a request for a webpage; generate the webpage comprising a plurality of content items; generate a list identifying each content item within the plurality of content items; communicate, over the network, a browser-executable security script and the list to the web browser; and communicate, over the network, the webpage to the web browser.

Embodiment 2. The web server of embodiment 1, wherein the request is a search query.

Embodiment 3. The web server of any one of the above embodiments, wherein the request is an HTTP Get request.

Embodiment 4. The web server of any one of the above embodiments, wherein the webpage is generated dynamically by identifying the plurality of content items and merging them into a display template to form the webpage.

Embodiment 5. The web server of any one of the above embodiments, further configured to receive a notification from the browser-executable security script, the notification providing details about a change made to the webpage by a browser add-in.

Embodiment 6. The web server of any one of the above embodiments, wherein the change is adding a script to the webpage.

Embodiment 7. A method to prevent a web browser add-in from adding secondary content to a user interface displaying a webpage through a web browser, the method comprising: communicating, over a network, a request for the webpage to a web server, the webpage comprising a plurality of content items; receiving, over the network, a browser-executable security script and a list identifying content items within the plurality of content items on the webpage; receiving, over the network, the webpage; running the browser-executable security script to monitor attempted changes to the webpage; outputting the webpage for display; detecting, by the browser-executable security script, an attempt to add a content item to the webpage; determining that the content item is not included in the list; and preventing the content item from being displayed through the web browser while the webpage is being displayed by the web browser.

Embodiment 8. The method of embodiment 7, wherein the content item is one of a script, an image, or a frame.

Embodiment 9. The method of any one of embodiment 7 or 8, wherein the browser-executable security script is received before the webpage is received and after the webpage is requested, and wherein the browser-executable security script is received from the web server.

Embodiment 10. The method of any one of embodiment 7, 8, or 9, wherein the attempt to add the content item to the webpage is made by a browser extension application.

Embodiment 11. The method of any one of embodiment 7, 8, 9, or 10, wherein the method further comprises: running the browser-executable security script to monitor the webpage by adding an observer to an observable content item; detecting, by the observer, a change to the observable content item; determining that the change is not valid because an identification information for a new observable content item is not on the list; and removing the change by reverting to an original document object model.

Embodiment 12. The method of embodiment 11, wherein the observer is a Java interface function that generates a notice when a change is made to an object the observer is directed to observe.

Embodiment 13. The method of embodiment 11, wherein the change is displaying a secondary image in a location on the webpage currently occupied by the observable content item.

Embodiment 14. The method of any one of embodiment 7, 8, 9, 10, 11, 12, or 13, wherein the browser-executable security script is run prior to completely displaying the webpage in the web browser.

Embodiment 15. The method of any one of embodiment 7, 8, 9, 10, 11, 12, 13, or 14, wherein the browser-executable security script is a JavaScript.

Embodiment 16. One or more computer storage media having computer-executable instructions embodied thereon that, when executed, configure a computing device to perform a method to prevent a web browser add-in from adding secondary content to a user interface displaying a webpage through a web browser, the method comprising: communicating, over a network, a request for the webpage to a web server; receiving, over the network, a browser-executable security script and a list identifying content items within a plurality of content items on the webpage; receiving, over the network, the webpage; outputting the webpage for display, the webpage comprising a document object model; running the browser-executable security script to monitor the webpage by adding an observer to a content item; detecting, by the observer, a change to the content item; determining that the change is not valid because an identification information for a new content item is not on the list; and removing the change by reverting to an original document object model.

Embodiment 17. The media of embodiment 16, wherein the method further comprises communicating data about the detected change to the web server for training.

Embodiment 18. The media of any one of embodiment 16 or 17, wherein the browser-executable security script is a JavaScript.

Embodiment 19. The media of any one of embodiment 16, 17, or 18, wherein the browser-executable security script is run prior to completely displaying the webpage in the web browser.

Embodiment 20. The media of any one of embodiment 16, 17, 18, or 19, wherein the method further comprises: detecting, by the browser-executable security script, an attempt to add a content item to the webpage; determining that the content item is not included in the list; and preventing the content item from being displayed through the web browser while the webpage is being displayed by the web browser.

Aspects of the technology have been described to be illustrative rather than restrictive. It will be understood that certain features and subcombinations are of utility and may be employed without reference to other features and subcombinations. This is contemplated by and is within the scope of the claims.

The invention claimed is:

1. A method to prevent a web browser add-in from adding secondary content to a user interface displaying a webpage through a web browser, the method comprising:

communicating, over a network, a request for the webpage to a web server, the webpage comprising a plurality of content items including third-party content at a URL;

receiving, over the network, a browser-executable security script and a list identifying content items within the plurality of content items on the webpage, wherein the third-party content is identified by the URL;
receiving, over the network, the webpage;
running the browser-executable security script to monitor attempted changes to the webpage;
outputting the webpage for display;
detecting, by the browser-executable security script, an attempt to add a content item to the webpage;
determining that the content item is not included in the list;
preventing the content item from being displayed through the web browser while the webpage is being displayed by the web browser, wherein the preventing includes overriding browser-defined functions by requiring validation before allowing any script to add or remove user interface elements from the webpage; and
communicating a violation notification to the web server upon the detecting the attempt to add the content item to the webpage.

2. The method of claim 1, wherein the content item is one of a script, an image, or a frame.

3. The method of claim 1, wherein the browser-executable security script is received before the webpage is received and after the webpage is requested, and wherein the browser-executable security script is received from the web server.

4. The method of claim 1, wherein the attempt to add the content item to the webpage is made by a browser extension application.

5. The method of claim 1, wherein the method further comprises:
running the browser-executable security script to monitor the webpage by adding an observer to an observable content item;
detecting, by the observer, a change to the observable content item;
determining that the change is not valid because an identification information for a new observable content item is not on the list; and
removing the change by reverting to an original document object model.

6. The method of claim 5, wherein the observer is a Java interface function that generates a notice when a change is made to an object the observer is directed to observe.

7. The method of claim 5, wherein the change is displaying a secondary image in a location on the webpage currently occupied by the observable content item.

8. The method of claim 1, wherein the browser-executable security script is run prior to completely displaying the webpage in the web browser.

9. The method of claim 1, wherein the browser-executable security script is a JavaScript.

10. One or more computer storage hardware media having computer-executable instructions embodied thereon that, when executed, configure a computing device to perform a method to prevent a web browser add-in from adding secondary content to a user interface displaying a webpage through a web browser, the method comprising:
communicating, over a network, a request for the webpage to a web server; the webpage comprising a plurality of content items including third-party content at a URL;
receiving, over the network, a browser-executable security script and a list identifying content items within the plurality of content items on the webpage, wherein the third-party content is identified by the URL;
receiving, over the network, the webpage;
outputting the webpage for display, the webpage comprising a document object model;
running the browser-executable security script to monitor the webpage by adding an observer to a content item;
detecting, by the observer, a change to the content item;
detecting that the change is unauthorized because an identification information for the change to the content is not on the list;
preventing the content item from being displayed through the web browser while the webpage is being displayed by the web browser, wherein the preventing includes overriding browser-defined functions by requiring validation before allowing any script to add or remove user interface elements from the webpage;
removing the change by reverting to an original document object model; and
communicating a violation notification to the web server upon the detecting the attempt to add the content item to the webpage.

11. The media of claim 10, wherein the method further comprises communicating data about the detected change to the web server for training.

12. The media of claim 10, wherein the browser-executable security script is a JavaScript.

13. The media of claim 10, wherein the browser-executable security script is run prior to completely displaying the webpage in the web browser.

14. The media of claim 10, wherein the method further comprises:
detecting, by the browser-executable security script, an attempt to add a content item to the webpage; and
determining that the content item is not included in the list.

15. A method to prevent a web browser add-in from adding secondary content to a user interface displaying a webpage through a web browser, the method comprising:
communicating, over a network, a request for the webpage to a web server, the webpage comprising a plurality of content items including third-party content at a URL;
receiving, over the network, a browser-executable security script and a list identifying content items within the plurality of content items on the webpage, wherein the third-party content is identified by the URL;
receiving, over the network, the webpage;
outputting the webpage for display, the webpage comprising a document object model;
running the browser-executable security script to monitor the webpage by adding an observer to a content item;
detecting, by the observer, a change to the content item;
detecting that the change is unauthorized because an identification information for the change to the content is not on the list;
preventing the content item from being displayed through the web browser while the webpage is being displayed by the web browser, wherein the preventing includes overriding browser-defined functions by requiring validation before allowing any script to add or remove user interface elements from the webpage;
removing the change by reverting to an original document object model; and
communicating a violation notification to the web server upon the detecting the attempt to add the content item to the webpage.

16. The method of claim 15, wherein the method further comprises communicating data about the detected change to the web server for training.

17. The method of claim 15, wherein the browser-executable security script is a JavaScript.

18. The method of claim 15, wherein the browser-executable security script is run prior to completely displaying the webpage in the web browser.

19. The method of claim 15, wherein the method further comprises:
- detecting, by the browser-executable security script, an attempt to add a content item to the webpage;
- determining that the content item is not included in the list; and
- preventing the content item from being displayed through the web browser while the webpage is being displayed by the web browser.

* * * * *